United States Patent [19]
Kasai et al.

[11] Patent Number: 5,566,571
[45] Date of Patent: Oct. 22, 1996

[54] DIFFERENTIAL PRESSURE DETECTING EQUIPMENT CAPABLE OF PREVENTING ACCUMULATION OF NON-CONDENSIBLE GASES

[75] Inventors: Eijoe Kasai; Tomohiko Masuda, both of Yokohama, Japan

[73] Assignee: Kabushiki Kaisha Toshiba, Kanagawa-ken, Japan

[21] Appl. No.: 411,993

[22] Filed: Mar. 28, 1995

[30]     Foreign Application Priority Data

Mar. 29, 1994  [JP]  Japan .................................. 6-059306

[51] Int. Cl.$^6$ .............................. G01F 23/00; G21C 17/00
[52] U.S. Cl. ............................................. 73/299; 376/258
[58] Field of Search ...................... 73/299, 292; 376/258, 376/211, 246, 247

[56]           References Cited

U.S. PATENT DOCUMENTS

| | | | |
|---|---|---|---|
| 3,371,534 | 3/1968 | Areley | 73/299 |
| 4,394,346 | 7/1983 | Movooka | 376/258 |
| 4,721,071 | 1/1988 | Fujigaya et al. | 123/41.21 |

OTHER PUBLICATIONS

Northeast Utilities, "Licensee Event Report 91–008–00", dated Apr. 17, 1991.
NRC Information Notice No. 92–54, "Level Instrumentation Inaccuracies Caused by Rapid Depressurization", dated Jul. 24, 1992.
NRC Generic Letter No. 92–04, "Resolution of the Issues Related & Reactor Vessel Water Level Instrumentation in BWRs Pursuant to 10CFR50.54(f)", dated Oct. 16, 1992.
NRC Bulletin 93–03, "Resolution of Issues Related to Reactor Vessel Water Level Instrumentation in BWRs", dated May 28, 1993.

*Primary Examiner*—Richard Chilcot
*Assistant Examiner*—Paul D. Amrozowicz
*Attorney, Agent, or Firm*—Finnegan, Henderson, Farabow, Garrett & Dunner, L.L.P.

[57]           ABSTRACT

A differential pressure detection equipment typically represented by a water level measuring apparatus provided for a nuclear power plant includes a condenser having a steam flow-in port connected to a steam phase side pressure detector through a connection pipe, a reference water column side instrument pipe connected to a bottom portion of the condenser, a variable water column side instrument pipe connected to a liquid phase side pressure detector and a pressure difference detector connected to both the instrument pipes for detecting a pressure difference between a reference water head pressure of the reference water column side instrument pipe and a variable water head pressure of the variable water column side instrument pipe. The connection pipe has an upward inclination θ from the steam phase side pressure detector to the condenser so as to satisfy an equation of 0<tan θ<D/L, in which D is an inner diameter of the connection pipe and L is an axial length of the connection pipe. These characteristic features are applied to the differential pressure detecting apparatus in which high and low pressure side detectors are connected to the condensers, respectively, and the connection pipes have substantially the same structure as that mentioned above.

16 Claims, 13 Drawing Sheets

DIFFERENTIAL PRESSURE DETECTING EQUIPMENT CAPABLE OF PREVENTING ACCUMULATION OF NON-CONDENSIBLE GASES

BACKGROUND OF THE INVENTION

The present invention relates to a differential pressure detecting equipment provided with a condenser having an inner condenser chamber used for a steam containing non-condensible gases, typically represented by, for example, a reactor water level measuring apparatus for measuring the reactor water level of a boiling water reactor.

As one typical example of a conventional differential pressure detecting equipment, there is provided a reactor water level measuring apparatus.

In a boiling water reactor as a light water reactor, a reactor pressure vessel is accommodated in a reactor containment vessel and the reactor water level of the reactor pressure vessel is usually measured by a reactor water level measuring apparatus making use of a pressure difference. A pressure difference type water level gauge is used in a conventional reactor water level measuring apparatus and a reactor water level measuring apparatus using the pressure difference type water level gauge will be described with reference to FIGS. 12 and 13.

A reactor pressure vessel 2 accommodated in a reactor containment vessel 1 is provided with a steam phase side pressure detector 4 located above a reactor water level WL above a core 3 and a liquid phase side pressure detector 5 located in a coolant (reactor water) below the water level WL, respectively.

The steam phase side pressure detector 4 of the reactor pressure vessel 2 is connected to a condenser 7, such as condenser tank, defining a condenser chamber, through an upwardly inclining connection pipe 6 and the condenser tank 7 cools and condenses the steam from the reactor pressure vessel 2 to water. A reference water column side instrument pipe 8 extends from the bottom of the condenser tank 7 and is connected to the high pressure side of a differential pressure detector 9. The pressure difference sensor 9 is installed externally of the reactor accommodating vessel 1.

A variable water column side instrument pipe 10 connected to the liquid phase side pressure detector 5 is connected to the low pressure side of the differential pressure detector 9 and a water head pressure resulting from the reactor water level WL acts on the differential pressure detector 9 through the instrument pipe 10. The water head pressure varies in accordance with the variation of the reactor water level WL.

Incidentally, the stream guided from the reactor pressure vessel 2 to the condenser tank 7 through the connecting pipe 6 is cooled and condensed in a condenser chamber 11 in the condenser tank 7 because the temperature of a condenser main body is lower than the temperature of saturated steam and stays in a liquid basin 11a formed on the bottom of the condenser tank 7 and in the reference water column side instrument pipe 8. Excessive water condensed in the condenser tank 7 returns to the reactor pressure vessel 2 as spill-over water because the connection pipe 6 inclines downward toward the reactor pressure vessel 2 so that a reference water level SWL is maintained in the condenser tank 7. A reference water head pressure resulting from the reference water level SWL acts on the high pressure side of the differential pressure detector 9.

As described above, since the reference water head pressure resulting from the reference water level SWL of the condenser tank 7 and a variable water head pressure resulting from the reactor water level WL are applied to the differential pressure detector 9, this detector 9 detects the difference between these water head pressures and outputs an electric signal converted in accordance with the pressure difference as a reactor water level signal S.

When the reactor water level WL is high, the variable water head pressure resulting from the water level WL increases and the pressure difference acting on the differential pressure detector 9 decreases, whereas when the reactor water level is low, the variable water head pressure resulting from the reactor water level WL decreases and the pressure difference acting on the differential pressure detector 9 increases.

As described above, the differential pressure detector type water level measuring apparatus using a condenser tank is utilized for various water level measuring apparatus in nuclear power plants, thermal power plants, chemical plants or the like, as well as flow meters therefor. When utilized for the flow meters, such flow meter is provided with, in substitution for the variable water column conduit in the water level measuring apparatus, a condenser tank and instrument pipes of the differential pressure detector type water level measuring apparatus of the type described above. However, the basic principle, that the water head difference of the instrument pipes is compared by the differential pressure detector and then a differential signal is outputted, is identical.

The conventional water level measuring apparatus of the boiling water reactor of the characteristics described above provides the following problems.

In the conventional reactor water level measuring apparatus, since the steam generated in the core 3 of the reactor pressure vessel 2 contains oxygen and hydrogen produced when the radioactive rays from a coolant (water) is decomposed in the core 3, there is a possibility that when the steam flowing from the steam phase side pressure detector 4 through the connection pipe 6 is condensed in the condenser tank 7, the oxygen and hydrogen as non-condensable gases are accumulated in a gas phase basin 11b located in the upper portion of the condenser tank 7.

As described above, there is a possibility that the accumulation of non-condensable gases in the condenser tank 7 is accelerated, the partial pressure of the non-condensable gases in the condenser tank 7 increases and an amount of dissolution of the non-condensable gases below the reference water level SWL and in the reference water column side instrument pipe 8 increases in the process in which the steam flowing from the reactor pressure vessel 2 is condensed in the condenser tank 7 depending upon the disposition and development of the connection pipe 6 interposed between the steam phase side pressure detector 4 and the condenser 7.

When the pressure in a reactor abruptly drops such as in loss of coolant accident (LOCA) in the state that oxygen and hydrogen are accumulated in the condenser tank 7, there is a possibility that the non-condensable gases dissolved below the reference water level SWL in the condenser tank 7 and in the water in the reference water column side instrument pipe 8 expand and push the water in the reference water column side instrument pipe 8 upward as well as the water staying in the condenser tank 7 and forming the reference water level SWL is pushed and returned into the reactor pressure vessel 2.

3

As a result, the reference water level SWL applying a certain reference water head pressure to the high pressure side of the differential pressure detector 9 abruptly varies and finally lowers. At the time, since the reference water level SWL lowers regardless of whether a pressure detected by the liquid phase side pressure detector 5 provided in the coolant of the reactor pressure vessel 2 is kept to a certain level, a pressure difference applied to the differential pressure detector 9 drops, thus causing a possibility that the reactor water level WL in the reactor pressure vessel 2 measures an apparent level which is higher than an actual level.

Since the above matters lead to an overestimation of an amount of water as a coolant held in the reactor, it has been desired for a reactor water level measuring apparatus to accurately measure a reactor water level from a view point of the improvement of operational reliability.

SUMMARY OF THE INVENTION

An object of the present invention is to substantially eliminate defects or drawbacks encountered in the prior art described above and to provide a reactor water level measuring apparatus, as a differential pressure detecting equipment, capable of preventing the accumulation of non-condensable gases in a condenser and the dissolution of the gases into condensed water and accurately measuring a water level at all times.

Another object of the present invention is to provide a water level measuring apparatus, as a differential pressure detecting equipment, capable of accurately measuring a water level even if the pressure in a reactor pressure vessel abruptly drops.

A further object of the present invention is to provide various types of water level measuring apparatus capable of preventing the accumulation of non-condensable gases in a condenser and the dissolution of the gases into condensed water.

A still further object of the present invention is to provide various types of water level measuring apparatus capable of accurately measuring a water level even in the case of abrupt pressure drops.

A still further object of the present invention is to provide a differential pressure detecting equipment capable of preventing the accumulation of non-condensable gases in a condenser and the dissolution of the gases into condensed water.

A still further object of the present invention is to provide a differential pressure detecting equipment capable of accurately measuring a pressure difference even in the case of abrupt pressure drops in a gas phase portion on a side to be measured in the equipment.

The above and other objects can be achieved according to the present invention by providing, in one aspect, a water level measuring apparatus including a condenser having a steam flow-in port connected to a steam phase side pressure detector through a connection pipe, a reference water column side pipe connected to a bottom portion of the condenser, a variable water column side pipe connected to a liquid phase side pressure detector and a differential pressure detector connected to both the pipes for detecting a pressure difference between a reference water head pressure of the reference water column side pipe and a variable water head pressure of the variable water column side pipe, wherein the connection pipe has an upward inclination θ from the steam phase side pressure detector to the condenser so as to satisfy an equation of 0<tan θ<D/L, in which D is an inner diameter of the connection pipe and L is an axial length of the connection pipe.

In preferred embodiments of this aspect, the condenser has an inner condenser chamber having a liquid phase side and a gas phase side above the liquid phase side and a top wall of the condenser chamber of the gas phase side is inclined downward from the steam flow-in port.

The water level measuring apparatus may further comprise a thermometer for measuring a temperature of the gas phase portion in the condenser, a temperature controller for monitoring the temperature detected by the thermometer and outputting a temperature drop signal when the temperature of the gas phase portion drops by a predetermined amount of temperature and an electric heater operating in response to the temperature drop signal to heat the condenser chamber. The heater may be disposed so as to heat the gas phase portion of the condenser chamber or the liquid phase portion thereof.

The water level measuring apparatus may further comprise a thermometer for measuring a temperature of the gas phase portion in the condenser, a temperature controller for monitoring the temperature detected by the thermometer and outputting a temperature drop signal when the temperature of the gas phase portion drops by a predetermined amount of temperature and a fan means operating in response to the temperature drop signal to air blow to the condenser chamber so as to increase a condensing ratio in the condenser and a steam flow-in efficiency therein.

The water level measuring apparatus may further comprise a thermometer for measuring a temperature of the gas phase portion in the condenser, a temperature controller for monitoring the temperature detected by the thermometer and outputting a temperature drop signal when the temperature of the gas phase portion drops by a predetermined amount of temperature, a gas discharge vessel connected to the gas phase portion of the condenser through a connection pipe, and a valve means mounted to the connection pipe operating in response to the temperature drop signal.

In another aspect of the present invention, there is provided a differential pressure detecting equipment including a first condenser having a steam flow-in port connected to a high pressure side pressure detector through a first connection pipe, a first pipe connected to a bottom portion of the first condenser, a second condenser having a steam flow-in port connected to a low pressure side pressure detector through a second connection pipe, a second pipe connected to a bottom portion of the second condenser, and a differential pressure detector for detecting a pressure difference between water heads in the first and second pipes, wherein the first and second connection pipes have upward inclinations θ respectively from the corresponding pressure detectors to the first and second condensers so as to satisfy an equation of 0<tan θ<D/L, in which D is an inner diameter of each of the connection pipes and L is an axial length of each of the connection pipes.

In preferred embodiments of this aspect, each of the first and second condensers is provided with an inner condenser chamber having a liquid phase side and a gas phase side above the liquid phase side and a top wall of the condenser chamber of the gas phase side is inclined downward from the steam flow-in port.

The differential pressure detecting equipment may further comprise first and second thermometers for measuring temperatures of the gas phase portions in the first and second condensers, first and second temperature controllers for monitoring the temperatures detected by the thermometers and outputting temperature drop signals when the temperatures of the gas phase portions drop by predetermined amount of temperature and first and second electric heaters operating in response to the temperature drop signals to heat the condenser chambers. The each of the electric heaters is disposed so as to heat the gas phase portion of the condenser chamber or heat the liquid phase portion thereof.

The differential pressure detecting equipment may further comprise first and second thermometer for measuring temperatures of the gas phase portions in the first and second condensers, first and second temperature controllers for monitoring the temperatures detected by the first and second thermometers and outputting temperature drop signals when the temperatures of the gas phase portions drop by predetermined amount of temperatures and first and second fan means operating in response to the temperature drop signals to apply forced air to the first and second condenser chambers so as to increase condensing ratios in the condensers and steam flow-in efficiencies therein.

The differential pressure detecting equipment may further comprise first and second thermometers for measuring temperatures of the gas phase portions in the first and second condensers, a first and second temperature controllers for monitoring the temperatures detected by the first and second thermometer and outputting temperature drop signals when the temperatures of the gas phase portions drop by predetermined amount of temperature, first and second gas discharge vessels connected to the gas phase portions of the condensers through connection pipes, and valve means mounted to the connection pipes operating in response to the temperature drop signals.

According to the above first aspect, the connection pipe has an upward inclination $\theta$ from the steam phase side pressure detector to the condenser so as to satisfy an equation of $0<\tan \theta <D/L$, in which D is an inner diameter of the connection pipe and L is an axial length of the connection pipe, and accordingly, the lowest portion of the steam flow-in port of the condenser is positioned higher than the highest portion of the pressure detection side nozzle of the connection pipe, whereby the non-condensable gas is hardly accumulated in the gas phase portion in the condenser chamber, and hence, the non-condensable gas is substantially not dissolved in the condensed water in the reference water column pipe. Thus, the variation of the reference water level in the condenser can be effectively suppressed even in the abrupt pressure drop of the gas phase pressure on the side to be measured, and the water level signal generated from the pressure difference detector can be improved in its accuracy.

According to the characteristic features of the preferred embodiments of this aspect, since the upper wall portion of the gas phase portion of the condenser chamber has a downward inclination from the steam flow-in port thereof, the non-condensable gas is hardly accumulated in the gas phase portion in the condenser chamber, and hence, the non-condensable gas is substantially not dissolved in the condensed water in the reference water column instrument pipe. Thus, the variation of the reference water level in the condenser can be effectively suppressed even in the abrupt pressure drop of the gas phase pressure on the side to be measured, and the water level signal generated from the pressure difference detector can be improved in its accuracy.

Furthermore, the water level measuring apparatus is provided with the electric heater which operates in response to the temperature drop of the gas phase portion of the condenser to make high the saturated steam pressure, and accordingly, the non-condensable gases are positively discharged from the condenser by heating the condenser with the heater. Thus, the accumulation of the non-condensable gas and the dissolution of them into condensed water are effectively decreased. Thus, the variation of the reference water level in the condenser can be effectively suppressed even in the abrupt pressure drop of the gas phase pressure on the side to be measured, and the water level signal generated from the pressure difference detector can be improved in its accuracy.

Still furthermore, since the electric heater which operates in response to the temperature drop of the gas phase portion of the condenser is provided with the gas phase portion or liquid phase portion of the condenser and non-condensable gas is discharged by heating the condenser by the heater, substantially the same functions and effects as those described above can be achieved.

Still furthermore, since the gas partial pressure in the gas phase portion of the condenser is dropped by discharging non-condensable gas from the gas phase portion of the condenser to the gas escape vessel through a connection pipe to which a discharge valve is mounted in response to the temperature drop of the gas phase portion of the condenser. Accordingly, in this embodiment, substantially the same functions and effects can be achieved.

According to the other aspect of the characteristics described above, the pressure detection arrangements are provided for the high and low pressure sides each including the condenser having a steam flow-in port connected to a high pressure side pressure detector through the connection pipe, the pipe connected to the bottom portion of the condenser, which has the characteristics and structures described above with reference to the first aspect of the present invention. In this aspect, each of the connection pipes has an upward inclination $\theta$ from the pressure detector to the condenser so as to satisfy an equation of $0<\tan \theta <D/L$, in which D is an inner diameter of the connection pipe and L is an axial length of the connection pipe. Accordingly, the lowest portion of the steam flow-in port of each of the condensers is positioned higher than the highest portion of the pressure detection side nozzle of each of the connection pipe, whereby the non-condensable gas is hardly accumulated in the gas phase portion in the condenser chamber, and hence, the non-condensable gas is substantially not dissolved in the condensed water in the reference water column pipe. Thus, the variation of the reference water level in the condenser can be effectively suppressed even in the abrupt pressure drop of the gas phase pressure on the side to be measured, and the water level signal generated from the pressure difference detector can be improved in its accuracy.

According to the characteristic features of the preferred embodiments of this aspect, substantially the same functions and effects as those described with reference to the first aspect can be attained. That is, according to the preferred embodiments of this aspect, the non-condensable gas is hardly accumulated in the gas phase portion in the condenser chamber, and hence, the non-condensable gas is substantially not dissolved in the condensed water in the reference water column pipe. Thus, the variation of the reference water level in the condenser can be effectively suppressed even in the abrupt pressure drop of the gas phase pressure on the side to be measured, and the pressure difference signal generated from the pressure difference detector can be improved in its accuracy.

The above functions and effects of the present invention may be more remarkably achieved when the present invention is applied to a nuclear power plant, such as for a main steam pipe thereof and the like.

The nature and further features of the present invention will be made more clear hereunder through detailed description of the preferred embodiments with reference to the accompanying drawings.

DESCRIPTION OF THE PREFERRED EMBODIMENTS

The present invention will be described in detail hereunder through preferred embodiments of differential pressure detecting equipments, typically water level measuring equipments, by way of reactor water level measuring apparatus in conjunction with the accompanying drawings.

Figure 1:
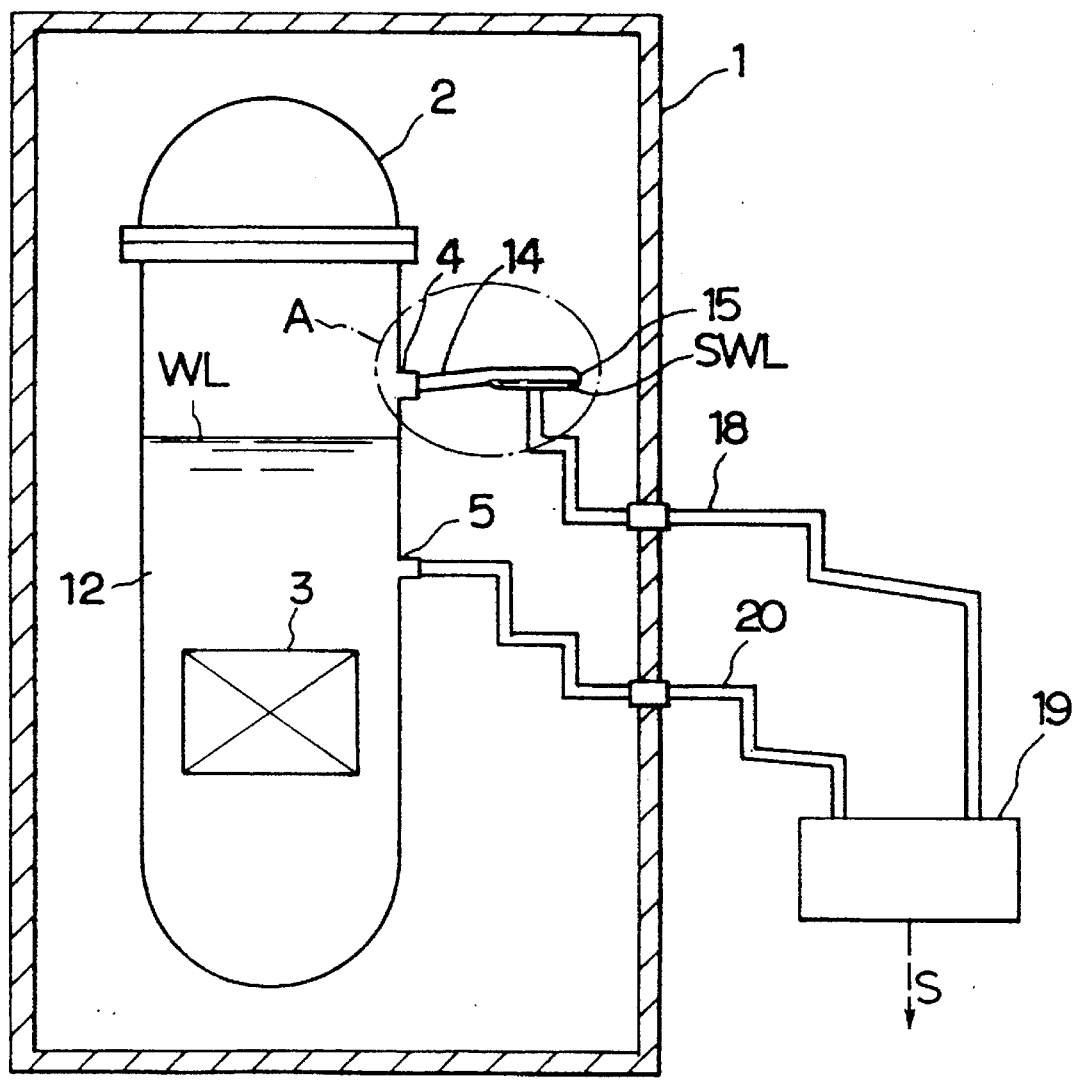
FIG. 1 is a view representing a systematic arrangement of a first embodiment of a reactor water level measuring apparatus according to the present invention.
Figure 2:
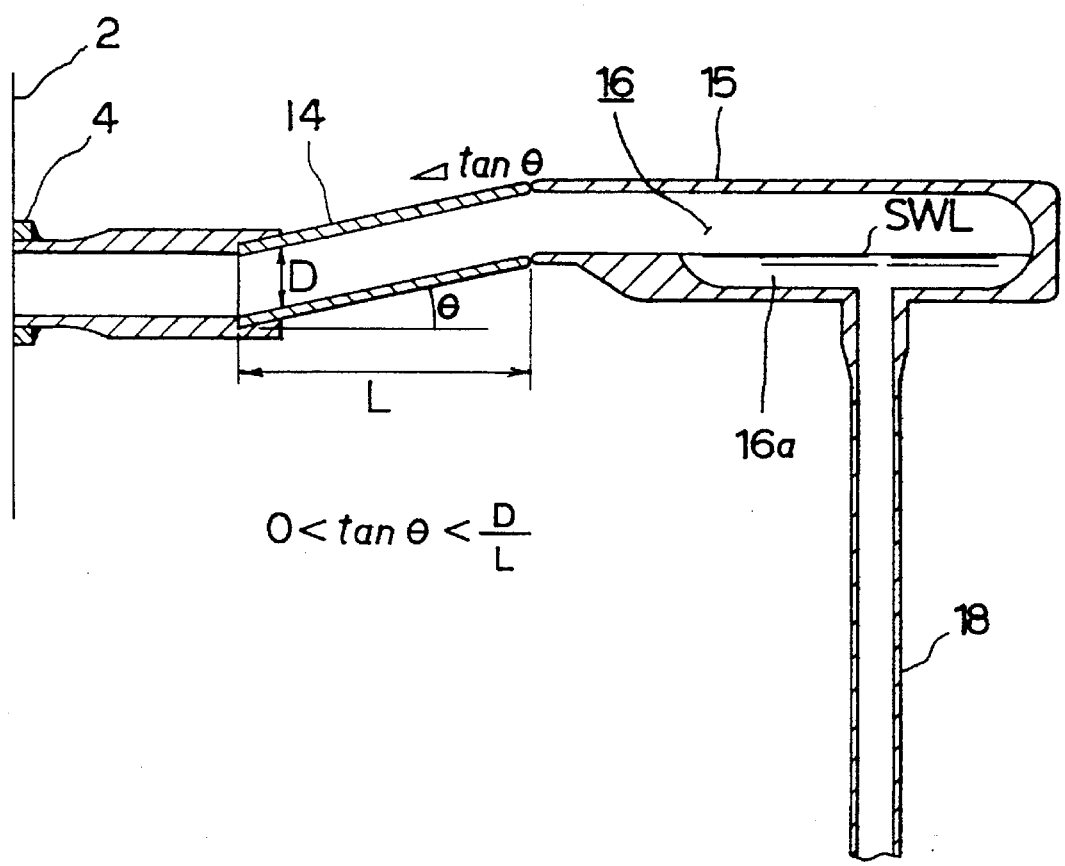
FIG. 2 is a detailed view showing a portion A in FIG. 1 and a portion E in FIG. 11 in an enlarged scale.

FIGS. 1 and 2 show a first embodiment of a reactor water level measuring apparatus according to the present invention applied to a boiling water reactor (BWR) as a light water reactor. The boiling water reactor includes a reactor pressure vessel 2 accommodated in a reactor containment vessel 1 and a core 3 is accommodated in the reactor pressure vessel 2 and dipped into water 12 as a coolant.

In the reactor pressure vessel 2, a steam phase side pressure detector 4 is disposed above the core 3 and a liquid phase side pressure detector 5 is disposed in the coolant below the detector 4, respectively. A nozzle portion of the steam phase pressure detector 4 is connected to a condenser 15, such as condenser tank, defining a condenser chamber 16, through a connection pipe 14 for cooling and condensing the steam from the reactor pressure vessel 2 so that the steam is made to water. The connection pipe 14 is arranged to have a gentle inclination so as to enable the return of spilled-over water condensed in the condenser tank 15.

The condenser tank 15 defines therein the condenser chamber 16, and a liquid basin 16a for condensed water is formed on the bottom of the condenser chamber 16. A reference water column side instrument pipe 18 extends from the basin 16a and connected to the high pressure side of a differential pressure detector 19 as a pressure difference type water level gauge. A reference water level SWL formed in the condenser tank 15 acts on the high pressure side of the differential pressure detector 19 through the reference water column side instrument pipe 18 and applied as a reference water head pressure.

A variable water column side instrument pipe 20 is connected to the low pressure side of the differential pressure detector 19 and also to the liquid phase side pressure detector 5 of the reactor pressure vessel 2. The reactor water level WL in the reactor pressure vessel 2 acts on the low pressure side of the differential pressure detector 19 through the instrument pipe 20 so that the variable water head pressure of the reactor water level WL is applied to the low pressure side.

The differential pressure detector 19 is disposed externally of the reactor pressure vessel 2 and the reference water head pressure of the reference water level SWL acting from the condenser tank 15 and the variable water head pressure resulting from the reactor water level WL act on the differential pressure detector 19, respectively and the differential pressure detector 19 outputs a reactor water level signal S by measuring a pressure difference between both the water head pressures.

According to the present invention, as shown in FIG. 2, supposing that the connection pipe 14 has an axial length L and an inner diameter D, and that the connection pipe has an inclination θ from the steam phase side detector 4 toward the condenser tank 15, an equation of 0<tan θ<D/L is satisfied. Accordingly, the reactor water level measuring apparatus is arranged such that the upper surface level of the gas phase portion in the condenser chamber 16 of the condenser tank 15 is set to substantially the same level as that of the upper surface of the connection pipe 14 and no gas phase basin is formed in the condenser tank 15. It is difficult for oxygen and hydrogen as inactive gases to stay in the condenser tank 15 because the condenser tank 15 is connected to the steam phase side pressure detector 4 of the reactor pressure vessel 2 through the connection pipe 14 having such a very gentle inclination, that is, the inclination θ is larger than 0 and less than D/L, so as to enable spilled-over water to return into the reactor pressure vessel 2.

Since the reactor water level measuring apparatus has no gas phase basin formed in the condenser 15 and non-condensable gases are difficult to be dissolved in the condensed water (reference water) contained in the condenser tank 15 and in the reference water column side instrument pipe 18, even if the pressure in the reactor pressure vessel 2 abruptly drops, a less amount of non-condensable gases dissolved in the reference water column side instrument pipe 18 is discharged, so that the variation of the reference water level SWL caused by the discharge of the non-condensable gases is suppressed.

As a result, the phenomenon that the reference water level SWL applying a certain reference water head pressure to the high pressure side of the differential pressure detector 19 varies and finally lowers can be effectively prevented. Consequently, it can be securely prevented that the reference water level SWL lowers and a differential pressure applied to the differential pressure detector 19 drops and the reactor water level WL in the reactor pressure vessel 2 measures an apparent level which is higher than an actual level and an amount of water held by the reactor is overestimated regardless of that the reactor water level WL in the reactor pressure vessel 2 is not varied and maintained to a certain level, thus accurately measuring a reactor water level.

Next, a second embodiment of the reactor water level measuring apparatus according to the present invention will be described hereunder with reference to FIGS. 3 and 4. In the description of the apparatus, the same numerals as used in the reactor water level measuring apparatus shown in FIGS. 1 and 2 are used to denote the same parts and members and the description of them is omitted.

Figure 4:
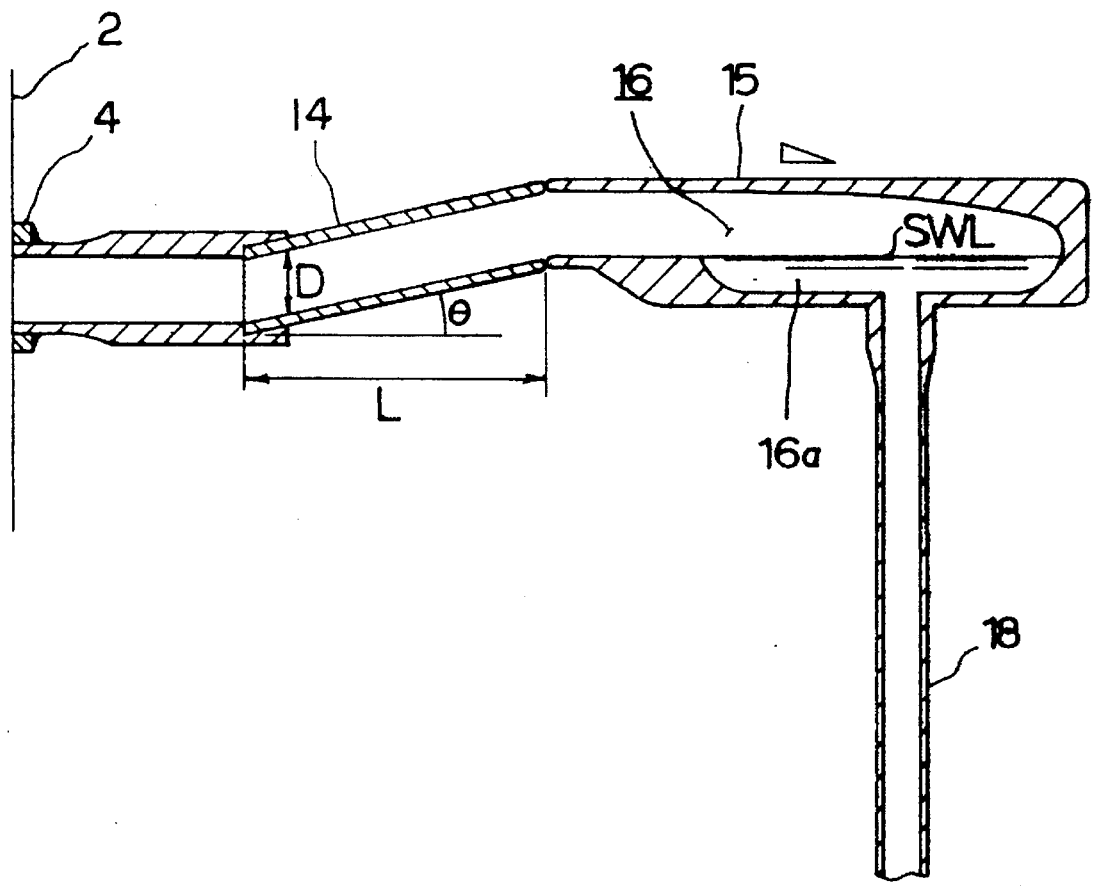
FIG. 4 is a detailed view showing a portion B in FIG. 3 and a portion E in FIG. 11 in an enlarged scale.
Figure 5:
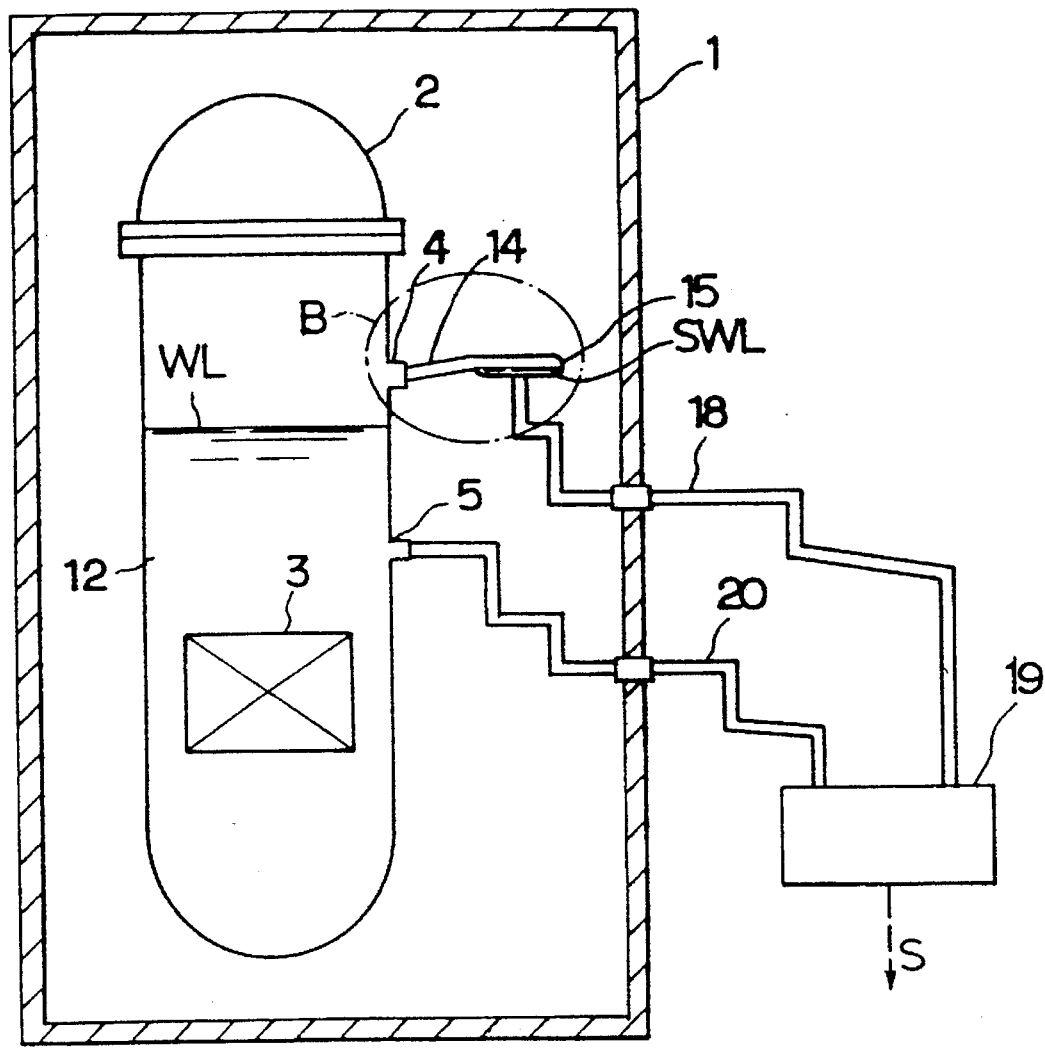
FIG. 5 is a view showing reactor water level measuring apparatus concerning third, fourth and fifth embodiments of the present invention.

In this embodiment, as shown in FIG. 4, the condenser chamber 16 of the condenser tank 15 has an upper inner wall inclining downward from the steam inlet side so as not to easily form the gas phase basin in the condenser tank 15, and hence, non-condensible gases such as oxygen and hydrogen gases are not likely stored in the condenser chamber 16. In this second embodiment, the connection pipe 14 is arranged with the inclination θ so as to satisfy the equation 0<tan θ<D/L. Accordingly, the reactor water level measuring apparatus is arranged such that the upper surface level of the gas phase portion in the condenser chamber 16 of the condenser tank 15 is set to substantially the same level as that of the upper surface of the connection pipe 14 and no gas phase basin is formed in the condenser tank 15. It is difficult for oxygen and hydrogen as inactive gases to stay in the condenser tank 15 because the condenser tank 15 is connected to the steam phase side pressure detector 4 of the reactor pressure vessel 2 through the connection pipe 14 having the inclination θ larger than 0 and less than D/L, so as to enable spilled-over water to return into the reactor pressure vessel 2.

According to this embodiment, also since the reactor water level measuring apparatus has no gas phase basin formed in the condenser tank 15 and non-condensable gases are extremely difficult to be dissolved in the condensed water (reference water) contained in the condenser tank 15 and in the reference water column side instrument pipe 18, even if the pressure in the reactor pressure vessel 2 abruptly drops, a less amount of non-condensable gases dissolved in the reference water column side instrument pipe 18 is discharged, so that the variation of the reference water level SWL caused by the discharge of the non-condensable gases is suppressed.

As a result, the phenomenon that the reference water level SWL applying a certain reference water head pressure to the high pressure side of the differential pressure detector 19 varies and finally lowers can be effectively prevented. Consequently, it can be securely prevented that the reference water level SWL lowers and a differential pressure applied to the differential pressure detector 19 drops and the reactor water level WL in the reactor pressure vessel 2 measures an apparent level which is higher than an actual level and an amount of water held by the reactor is overestimated regardless of that the reactor water level WL in the reactor pressure vessel 2 is not varied and maintained to a certain level, thus accurately measuring a reactor water level WL.

Figure 3:
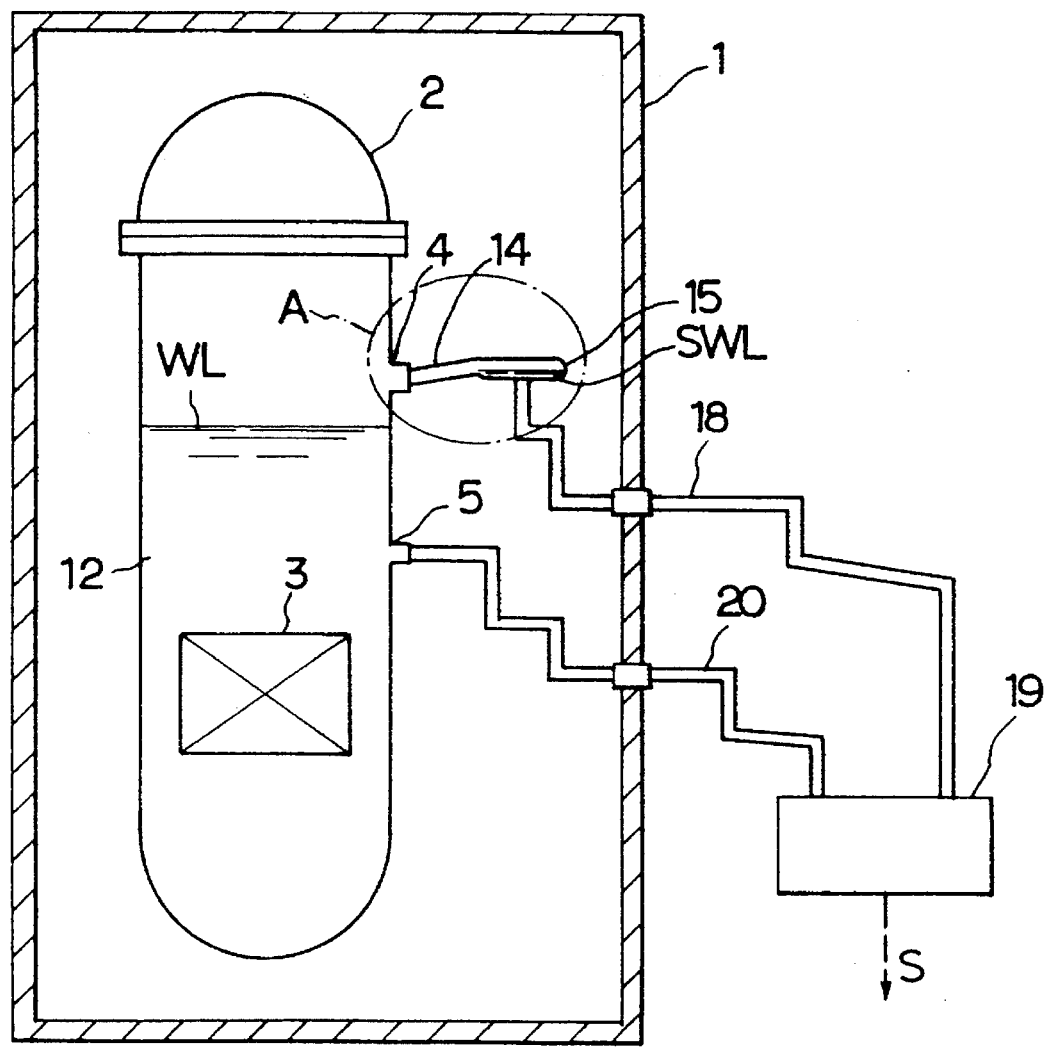
FIG. 3 is a view representing a systematic arrangement of a second embodiment of the reactor water level measuring apparatus according to the present invention.
Figure 6:
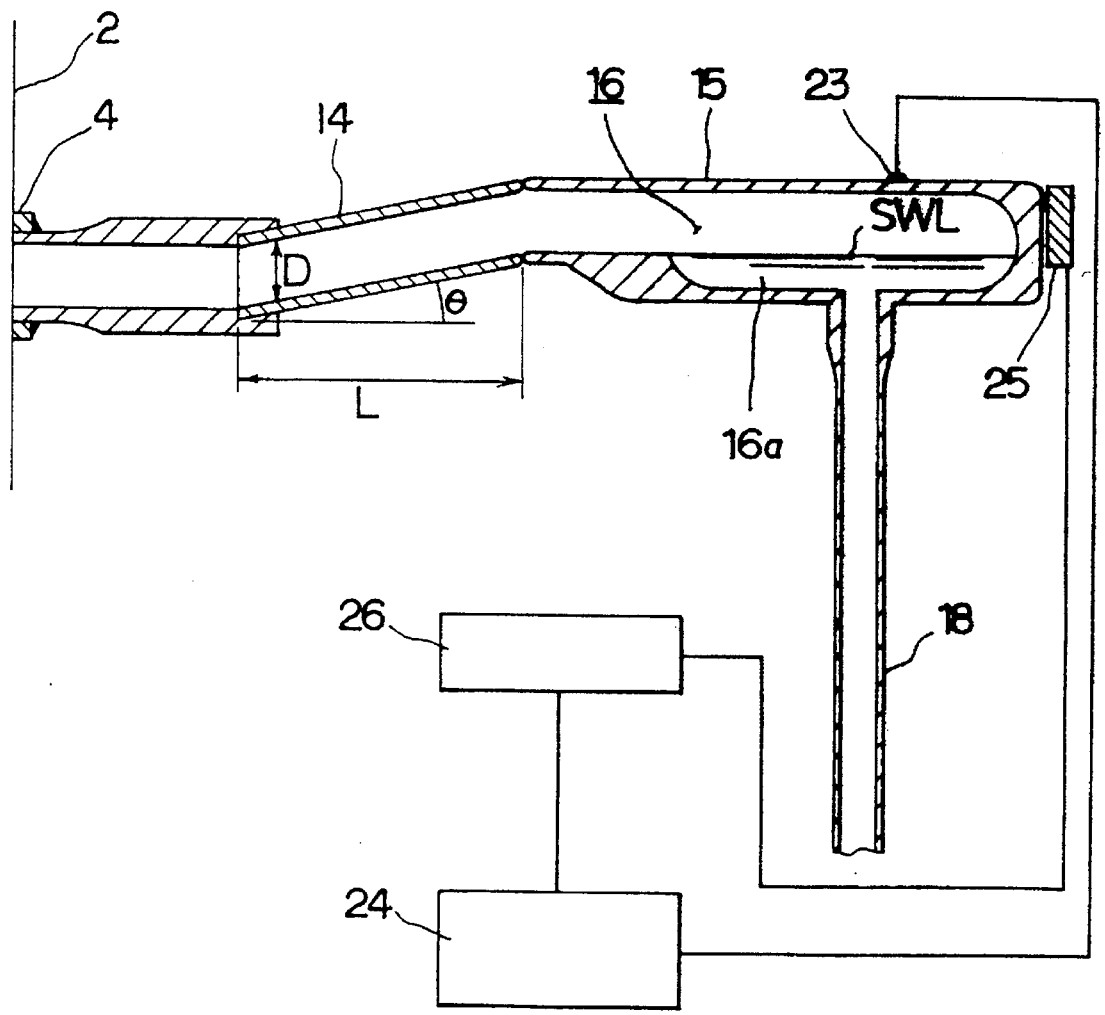
FIGS. 6, 7 and 8 are detailed view, concerning the third, fourth and fifth embodiments, showing a portion C in FIG. 5 and a portion E in FIG. 11 in an enlarged scale.

FIG. 6 represents a third embodiment of the water level measuring apparatus according to the present invention, in which like reference numerals are added to portions or members corresponding to those shown in FIG. 1 or 3, and detailed description thereof is omitted here.

According to this third embodiment, the reactor water level measuring apparatus is provided with a thermometer 23 for measuring the temperature of a gas phase portion as an upper portion of the condensing chamber 16 of a condenser tank 15, a temperature controller 24 for detecting the predetermined temperature drop of a detected temperature, and a band heater 25 as an electric heater to which an electric power is supplied from a power source 26 by the temperature controller 24 are disposed in the gas phase portion.

When a predetermined amount of temperature drop is detected in the gas phase portion of the condenser by the thermometer 23 in the reactor water level measuring apparatus, the power source 26 is turned on by the temperature controller 24 and the gas phase portion of the condenser tank 15 is heated from the outer periphery thereof by the band heater 25 to make the partial pressure of the steam in the gas phase portion of the condenser tank equal to the pressure in the reactor pressure vessel 2 so that non-condensable gases are expanded and positively discharged from the condenser tank 15 to the reactor pressure vessel 2. Thereafter, when a target temperature is achieved, the heating is finished.

In this third embodiment, the connection pipe 14 is also arranged with the inclination θ so as to satisfy the equation 0<tan θ<D/L. Accordingly, the reactor water level measuring apparatus is arranged such that the upper surface level of the gas phase portion in the condenser chamber 16 of the condenser tank 15 is set to substantially the same level as that of the upper surface of the connection pipe 14 and no gas phase basin is formed in the condenser tank 15. It is difficult for oxygen and hydrogen as inactive gases to stay in the condenser tank 15 because the condenser tank 15 is connected to the steam phase side pressure detector 4 of the reactor pressure vessel 2 through the connection pipe 14 having the inclination e larger than 0 and less than D/L, so as to enable spilled-over water to return into the reactor pressure vessel 2. Thus, substantially the same functions and effects as those attained by the first embodiment described hereinbefore can be achieved.

Figure 7:
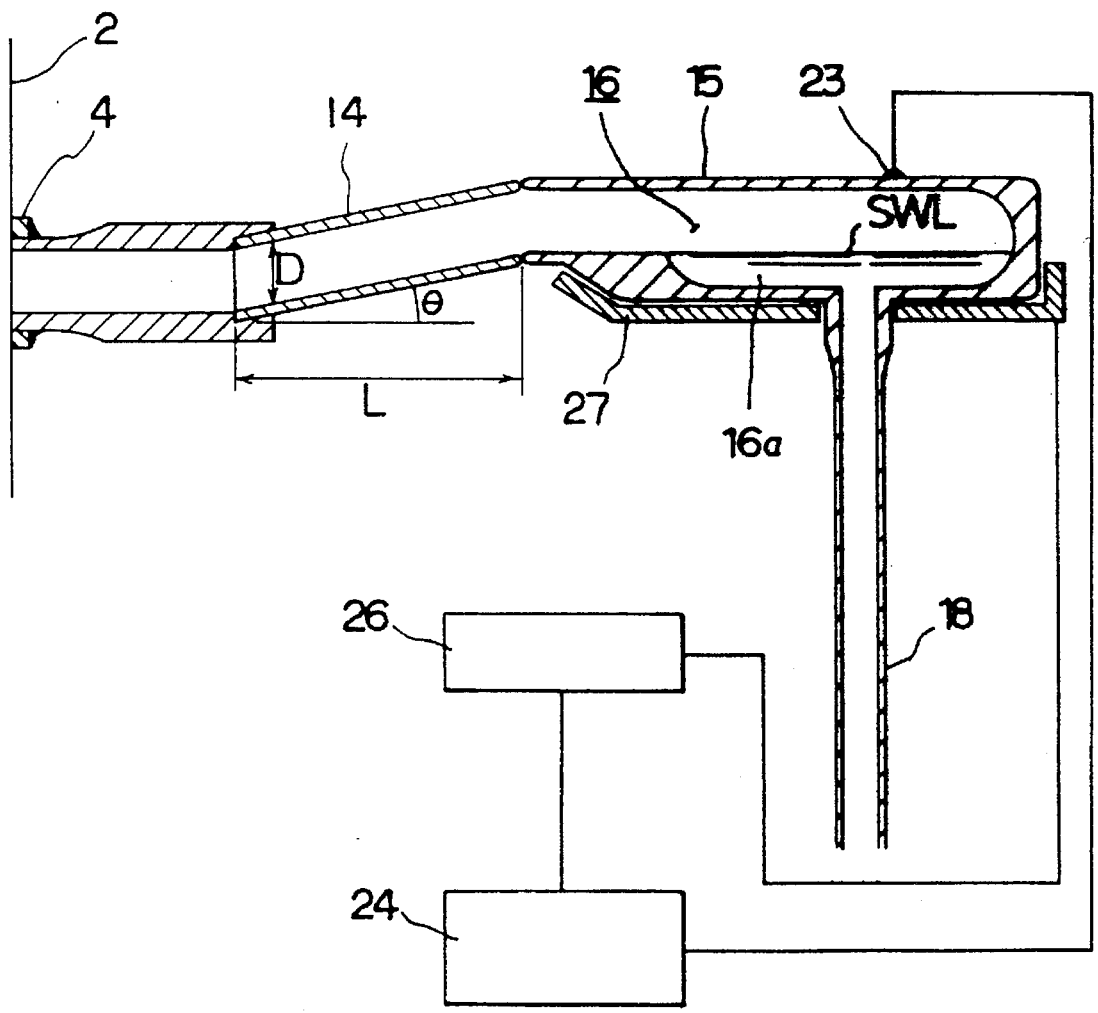

FIG. 7 represents a fourth embodiment of the water level measuring apparatus according to the present invention, in which like reference numerals are added to portions or members corresponding to those shown in FIG. 1 or 3, and detailed description thereof is omitted here.

According to this fourth embodiment, the reactor water level measuring apparatus is further provided with a thermometer 23 for measuring the temperature of the gas phase portion on the condensing chamber 16 of a condenser tank 15, disposed to the gas phase portion side, a temperature controller 24 for detecting a predetermined temperature drop detected by the thermometer 23, and a band heater 27 to which an electric power is supplied from a power source 26 by the operation of the controller 24. The band heater 27 is mounted to the portion corresponding to the liquid phase portion around the outer periphery of the condenser tank and wound around this portion.

According to this arrangement, when the temperature variation in the gas phase portion of the condenser tank is detected in the reactor water level measuring apparatus, the liquid phase portion of the condenser tank 15 is heated from the outer periphery thereof by the band heater 25 as an electric heater to make the partial pressure of the steam in the gas phase portion of the condenser tank equal to the pressure in the reactor pressure vessel 2 so that non-condensable gases are positively discharged from the condenser tank 15. Thereafter, when a target temperature is achieved, the heating is finished.

In this fourth embodiment, the connection pipe 14 is also arranged with the inclination θ so as to satisfy the equation $0 < \tan \theta < D/L$. Accordingly, the reactor water level measuring apparatus is arranged such that the upper surface level of the gas phase portion in the condenser chamber 16 of the condenser tank 15 is set to substantially the same level as that of the upper surface of the connection pipe 14 and no gas phase basin is formed in the condenser tank 15. It is difficult for oxygen and hydrogen as inactive gases to stay in the condenser tank 15 because the condenser tank 15 is connected to the steam phase side pressure detector 4 of the reactor pressure vessel 2 through the connection pipe 14 having the inclination θ larger than 0 and less than D/L, so as to enable spilled-over water to return into the reactor pressure vessel 2. Thus, substantially the same functions and effects as those attained by the first embodiment described hereinbefore can be achieved.

That is, according to this fourth embodiment, since the reactor water level measuring apparatus is arranged such that the non-condensable gases are difficult to be accumulated in the condenser tank 15, a very small amount of the non-condensable gases is dissolved into the reference water column side instrument pipe 18 and the variation of the reference water level SWL in the condenser tank 15 caused when a pressure drops is difficult to arise similarly to the reactor water level measuring apparatus of the former embodiments, the reactor water level WL can be measured with a high accuracy.

Figure 8:
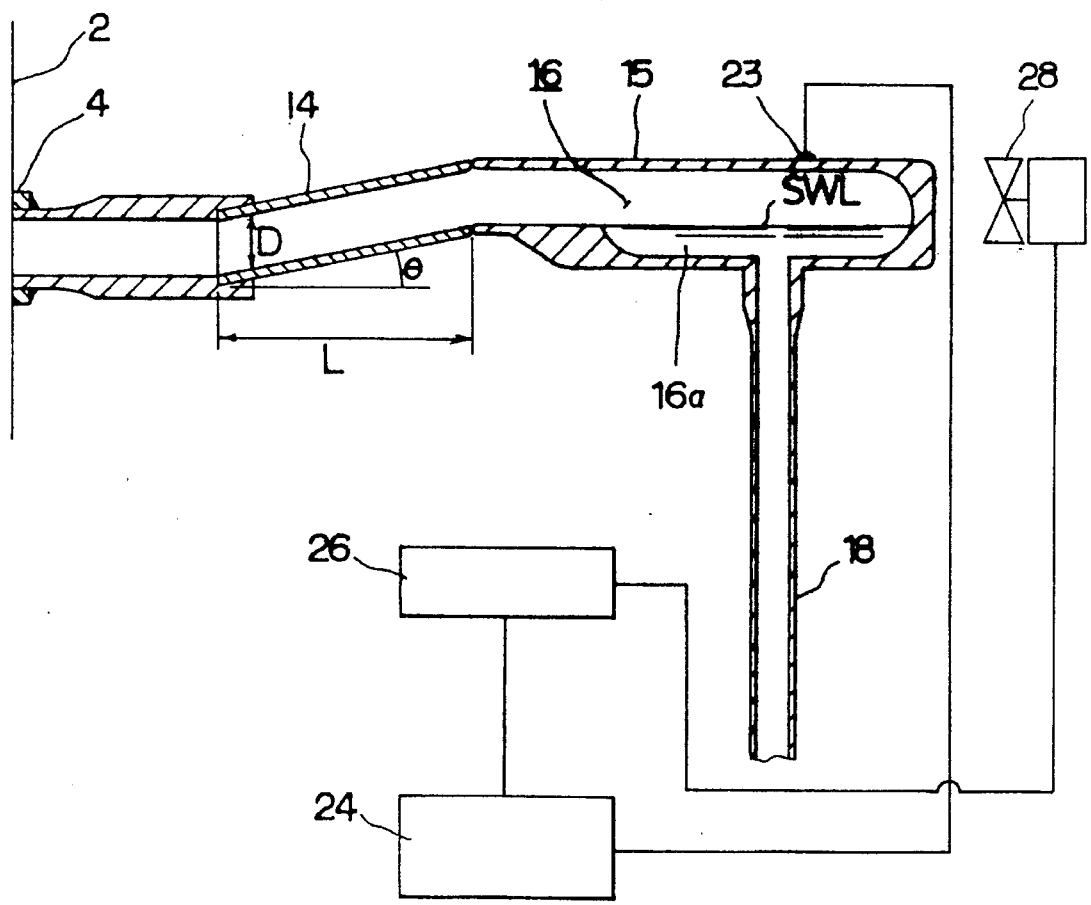

FIG. 8 represents a fifth embodiment of the water level measuring apparatus according to the present invention, in which like reference numerals are added to portions or members corresponding to those shown in FIG. 1 or 3, and detailed description thereof is omitted here.

The water level measuring apparatus of the fifth embodiment is provided with a thermometer 23 disposed on the gas phase side above the condenser chamber 16 of the condenser tank 15 for measuring the temperature of the gas phase portion, a controller 24 for detecting a temperature drop detected by the thermometer 23 and an electric fan 28 operated under current conducting control by the controller 24 for cooling the outer surface of the condenser tank 15. According to this arrangement, the temperature variation in the gas phase portion of the condenser tank 15 is detected, and the fan 28 is operated so that the steam component pressure of the gas phase portion of the condenser tank approaches the pressure in the reactor pressure vessel. According to this blowing manner, the condensing ratio of the condenser tank 15 increases and the steam flow-in rate also increases, thereby discharging the non-condensible gases from the condenser tank 15. When the aimed temperature is obtained, the operation of the fan 28 is stopped.

According to this fifth embodiment, since the reactor water level measuring apparatus is arranged such that the non-condensable gases are difficult to be accumulated in the condenser tank 15, a very small amount of the non-condensable gases is dissolved into the reference water column side instrument pipe 18 and the variation of the reference water level SWL in the condenser tank 15 caused when a pressure drops is difficult to arise similarly to the reactor water level measuring apparatus of the former embodiments, the reactor water level WL can be measured with a high accuracy.

Figure 9:
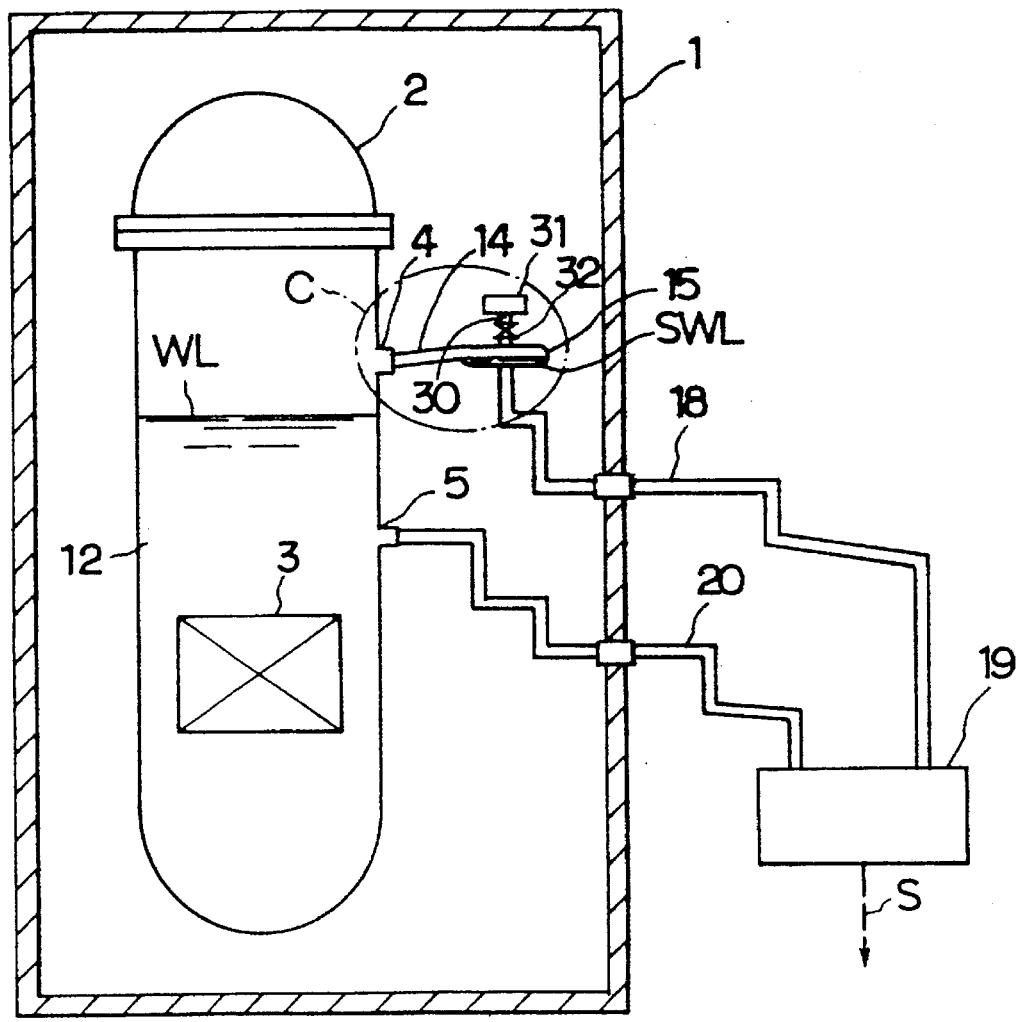
FIG. 9 is a view representing a systematic arrangement of a sixth embodiment of the reactor water level measuring apparatus according to the present invention.
Figure 10:
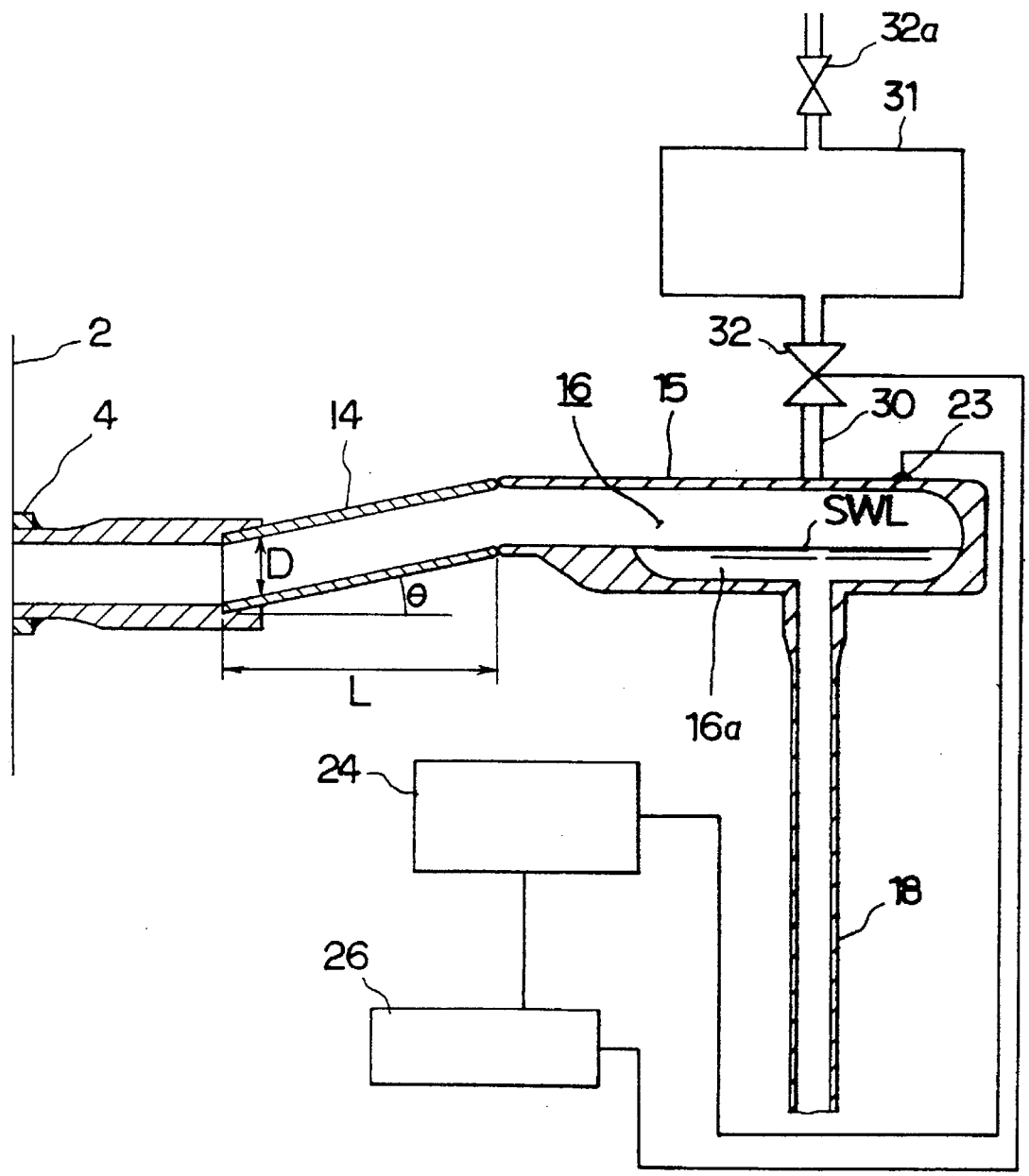
FIG. 10 is a detailed view of a portion D in FIG. 9 in an enlarged scale.

FIGS. 9 and 10 show a sixth embodiment of the reactor water level measuring apparatus according to the present invention. The same numerals as used in the measuring apparatus of the first embodiment are used to denote the same parts and portions in the reactor water level measuring apparatus of this embodiment and the description of them is omitted.

In the reactor water level measuring apparatus of this sixth embodiment, there is provided a gas escape vessel 31 which is connected to a gas phase portion formed on the condenser chamber 16 of a condenser tank 15 through a communicating pipe 30 and a valve 32 such as an electromagnetic valve or the like is provided with the communicating pipe 30. The gas amount in the gas escape vessel 31 is adjusted by means of another valve 32a.

On the other hand, the condenser 15 includes a thermometer 23 for measuring the temperature of the gas phase portion, a temperature controller 24 for monitoring the temperature detected by the thermometer 23 and outputting a temperature drop signal when the detected temperature drops by a predetermined amount and a valve opening/closing power source 26 for supplying an electric power controlled by the operation of the temperature controller 24, and the power source 26 and the temperature controller 24 functions as an actuator for opening/closing the gas escape valve 32.

In the reactor water level measuring apparatus of the sixth embodiment, the temperature variation in the gas phase portion of the condenser tank is detected and non-condensable gases are discharged from the condenser tank 15 to the gas escape vessel 31 disposed to the upper portion of the condenser tank to make the partial pressure of the steam in the gas phase portion of the condenser tank equal to the pressure in the reactor pressure vessel 2. Consequently, since the partial pressure of the non-condensable gases in the gas phase portion of the condenser tank 15 is lowered, the dissolution of the non-condensable gases into the reference water column side instrument pipe 18 is suppressed to a low level and the variation of the reference water level in the condenser tank 15 caused when pressure drops is difficult to occur, a reactor water level can be measured with a high accuracy.

Since the reactor water level measuring apparatuses described in the above respective embodiments can accurately measure a reactor water level not only when a reactor is normally operated but also when the pressure in the reactor abruptly drops in a BWR plant, it is possible to improve the safe and reliable operation of the plant.

Figure 11:
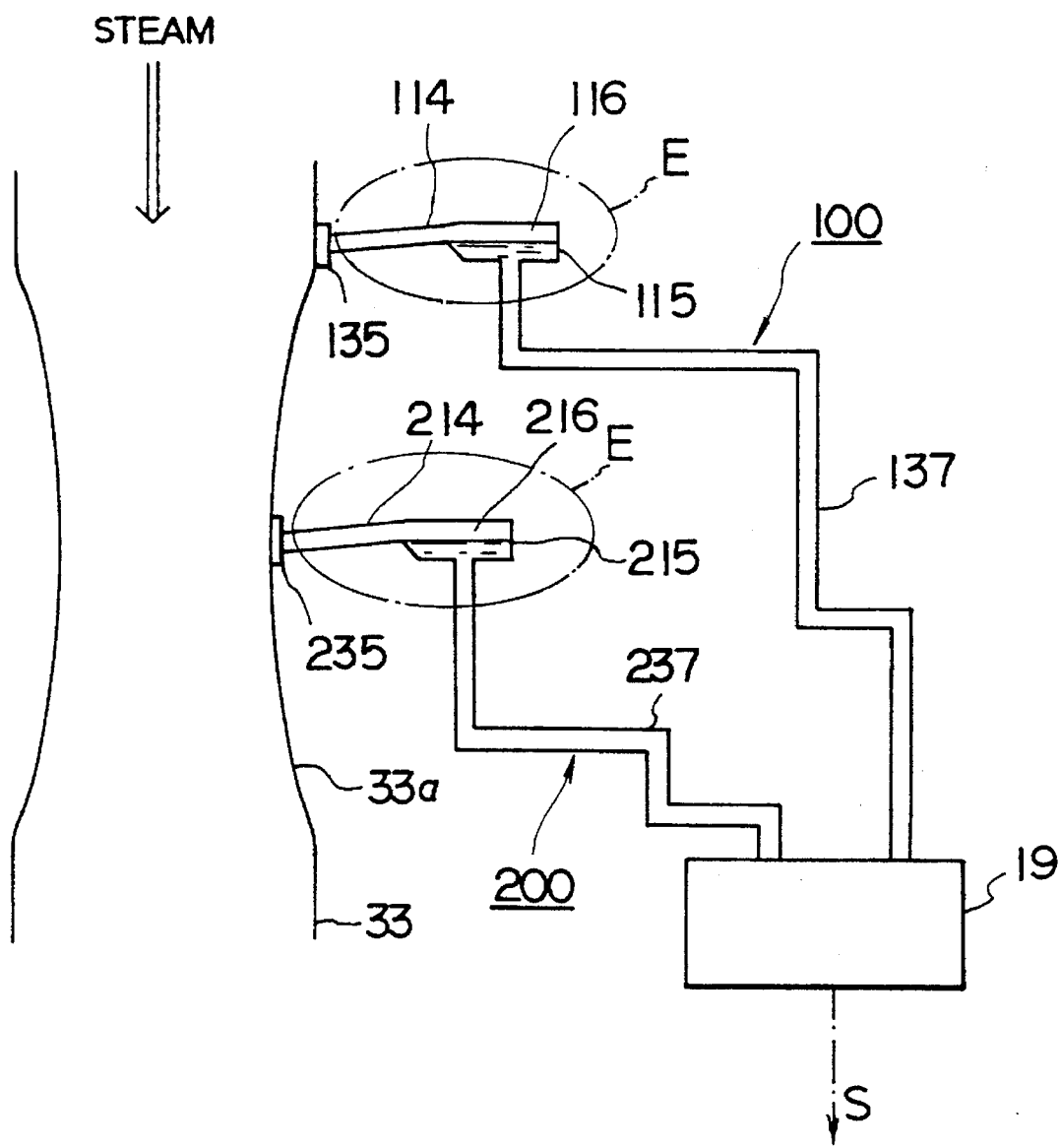
FIG. 11 is an illustrated systematic arrangement of a differential pressure detecting equipment of a seventh embodiment of the present invention.
Figure 12:
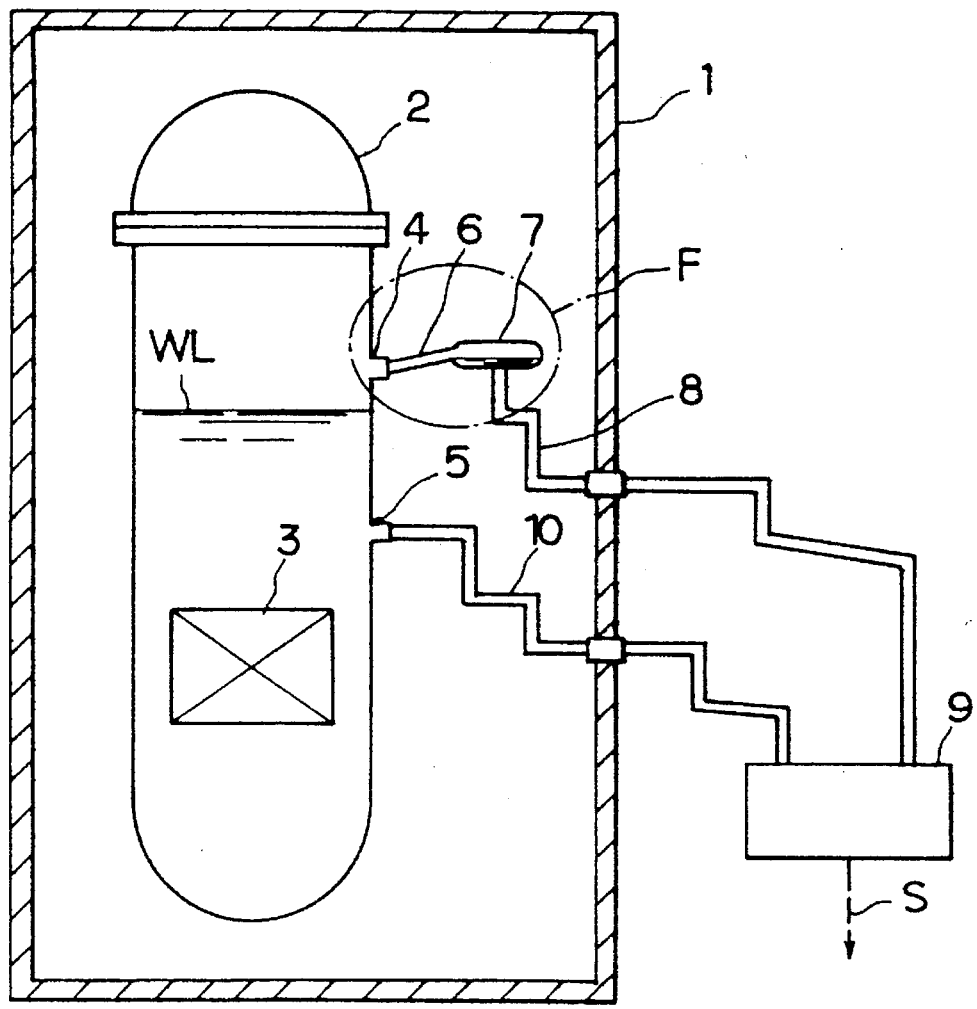
FIG. 12 is a view representing a systematic arrangement of a conventional reactor water level measuring apparatus.
Figure 13:
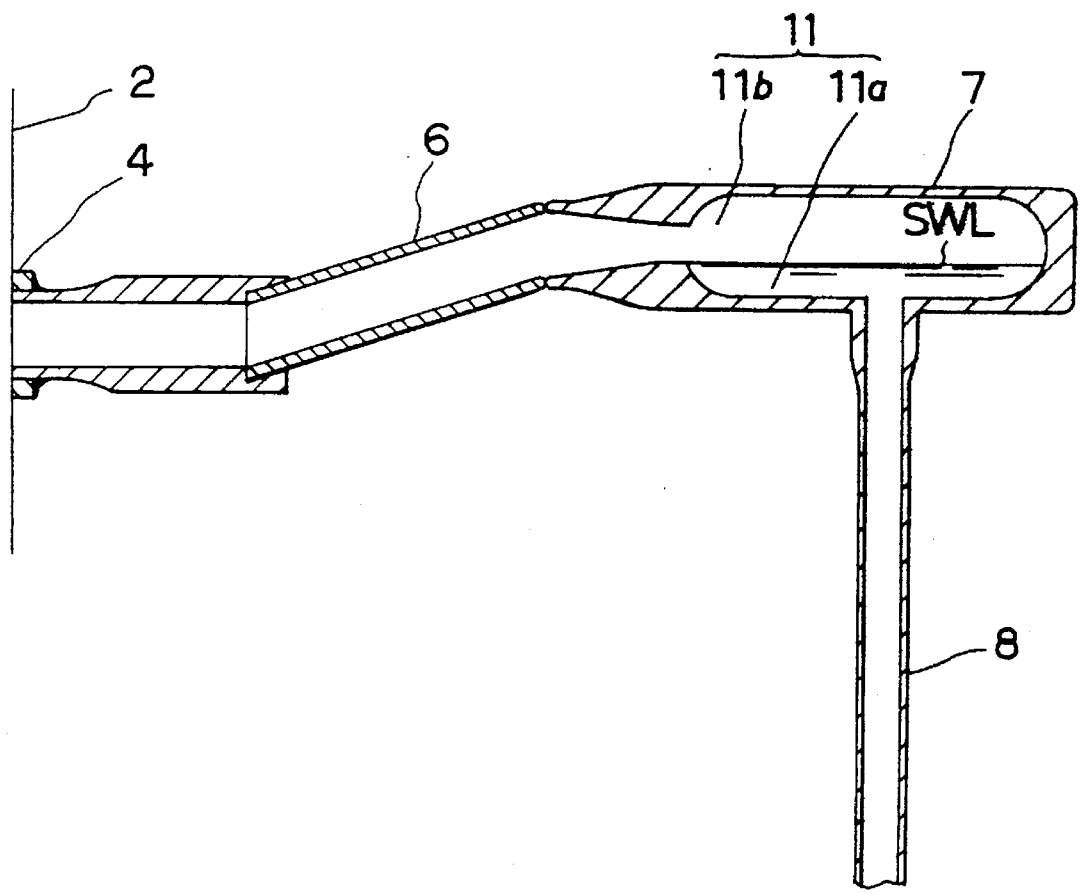
FIG. 13 is a detailed view showing a portion F in FIG. 12 in an enlarged scale.

FIG. 11 represents a differential pressure detecting equipment according to a seventh embodiment of the present invention. This embodiment will be preferably applicable to a venturi tube arrangement, such as main steam pipe provided for a reactor pressure vessel, in which a steam containing non-condensable gas flows, and a pressure difference is measured between high and low pressure sides of the steam pipe.

Referring to FIG. 11, reference numeral 33 denotes a venturi tube having a throttled portion 33a, and in the illustrated arrangement, a pressure difference detecting equipment comprises a high pressure side arrangement 100 connected to a high pressure side portion of the venturi tube 33, a low pressure side arrangement 200 connected to a low pressure side portion, i.e. throttled portion, 33a of the venturi tube 33, and a differential pressure detector 19. The high pressure side arrangement 100 comprises a high pressure side detector 135 mounted to the high pressure side of the venturi tube 33, a condenser tank 115 having a condenser chamber 116, a connection pipe 114 connecting the high pressure side detector 135 and the condenser tank 115, and a reference water column side instrument pipe 137 connected to the differential pressure detector 19. On the other hand, the low pressure side arrangement 200 comprises a low pressure side detector 235 mounted to the low pressure side of the venturi tube 33, a condenser tank 215 having a condenser chamber 216, a connection pipe 214 connecting the low pressure side detector 235 and the condenser tank 216, and a reference water column side instrument pipe 237 connected to the differential pressure detector 19.

In the arrangement of the differential pressure detecting equipment according to this embodiment, the structural features referred to hereinbefore with respect to the first and sixth embodiments are applied particularly to the connection pipes 114 and 214 and the condenser tanks 115 and 215.

Accordingly, although the detailed figures representing the preferred embodiments of the embodiment of FIG. 11 are not attached, the basic arrangements are as follows.

That is, in an embodiment adopting the first embodiment, the differential pressure detecting equipment of FIG. 11 has the structure in which, as shown in FIG. 2, the connection pipe 114 (214) has an axial length L and an inner diameter D, and that the connection pipe has an inclination θ from the high (low) pressure side detector 135 (235) toward the condenser tank 115 (215), an equation of $0 < \tan \theta < D/L$ is satisfied. Accordingly, the differential pressure detecting equipment has an arrangement such that the upper surface level of the gas phase portion in the condenser chamber 116 (216) of the condenser tank 115 (215) is set to substantially the same level as that of the upper surface of the connection pipe 114 (214) and no gas phase basin is formed in the condenser tank 115 (215). It is difficult for inactive gases such as oxygen and hydrogen to stay in the condenser tank 115 (215) because the condenser tank 115 (215) is connected to the high (low) pressure side pressure detector 135 (235) of the venturi tube 33 (33a) through the connection pipe 114 (214) having such a very gentle inclination, that is, the inclination θ is larger than 0 and less than D/L.

According to this embodiment, since the pressure difference detecting equipment has no gas phase basin formed in the condenser 115 (215) and non-condensable gases are difficult to be dissolved in the condensed water (reference water) contained in the condenser tank 115 (215), even if the pressure on the gas phase side to be measured abruptly drops, a less amount of non-condensable gases dissolved in the reference water column side instrument pipe is discharged, so that the variation of the reference water level caused by the discharge of the non-condensable gases is suppressed.

Consequently, it can be securely prevented that the reference water level lowers and a difference pressure applied to the pressure difference detector 19 drops, thus accurately measuring a differential pressure signal generated from the differential pressure detector 19.

In other embodiments concerning the arrangement of FIG. 11, in addition to the above structural features satisfied by the above equation $0 < \tan \theta < D/L$, the upper wall of the condenser tank 115 (215) is formed to be downward inclined, rightward as viewed in FIG. 2. According to this embodiment, the dissolution of the non-condensable gases in the condenser chamber 116 (216) can be less reduced and the variation of the reference water level is less caused, thus also obtaining the accurate differential pressure signal.

A heater means is also applied to the arrangement of FIG. 11 as shown in FIG. 6 or 7, and in this embodiment, the dissolution of the non-condensable gases in the condenser chamber 116 (216) can be less reduced and the variation of the reference water level is less caused at a time when the pressure on the gas phase side to be measured drops, thus also obtaining the accurate differential pressure signal.

A fan means is also applied to the arrangement of FIG. 11 as shown in FIG. 8, and in this embodiment, the dissolution of the non-condensable gases in the condenser chamber 116 (216) can be less reduced and the variation of the reference water level is less caused at a time when the pressure on the gas phase side to be measured drops, thus also obtaining the accurate differential pressure signal.

A gas escape means is also applied to the arrangement of FIG. 11 as shown in FIGS. 9 and 10, and in this embodiment, substantially the identical functions and effects as those described above can be achieved.

It is of course to be noted that in the above arrangements of the other embodiments, the other elements or units such as controller 24, power source 26 and the like may be applied to the respective embodiments, selectively as described hereinbefore with reference to the embodiments of FIGS. 1 to 10. Still furthermore, although in the above, it is described that the high and low pressure side arrangements 100 and 200 has substantially the same structures, these structures may differ in combination thereof except for the common feature represented by the equation of $0 < \tan \theta < D/L$. That is, for example, in another embodiment, the heater means of FIG. 6 may be applied to the high pressure side arrangement 100 and the heater means of FIG. 7 may be applied to the low pressure side arrangement 200. Such and other combinations of the above embodiments will be within the scope of the appended claims.

As described above, according to the differential pressure detecting equipment preferably represented by a reactor water level measuring apparatus of the present invention, since the upper surface level of the gas phase portion of the condenser tank is set to substantially the same level as that of the upper side of the connection pipe from the steam pipe and no gas phase basin is formed in the condenser tank, the accumulation of non-condensable gases in the condenser tank can be effectively prevented and the dissolution of the non-condensable gases into condensed water and the reference water column side instrument pipe can be decreased. The variation of the reference water level in the condenser tank can be suppressed even if the pressure on the gas phase side to be measured abruptly drops and the water level signal can be obtained from the pressure difference detector with an improved performance.

Consequently, the differential pressure detecting equipment such as typically represented by the water level measuring apparatus provided with the improved condenser tank unit can be operated with an improved performance under the use of the steam containing the non-condensable gases such as of a reactor pressure vessel of a BWR or a PWR at both the case of the normal operation time and of the abrupt drop of the pressure of the gas phase side to be measured, and hence, the pressure difference can be effectively and accurately detected, thus improving the safe and reliable operation performance.

What is claimed is:

1. A water level measuring apparatus for measuring a water level in response to a pressure difference between a steam phase side and a liquid phase side, comprising:

a steam phase side pressure detector for detecting a steam phase side pressure;

a condenser having a steam flow-in port and an inner condenser chamber;

a connection pipe connecting the steam phase side pressure detector and the steam flow-in port of the condenser;

a liquid phase side pressure detector for detecting a liquid phase side pressure;

a differential pressure detector connected to the condenser through a reference water column side pipe connected to a bottom portion of the condenser and connected to the liquid phase side pressure detector through a variable water column side pipe, respectively, to detect a pressure difference between a reference water head pressure of the reference water column side pipe and a variable water head pressure of the variable water column side pipe, wherein said connection pipe has an upward inclination θ from the steam phase side pressure detector to the condenser so as to satisfy an equation of 0<tan θ<D/L, in which D is an inner diameter of the connection pipe and L is an axial length of the connection pipe.

2. A water level measuring apparatus according to claim 1, wherein the condenser is provided with an inner condenser chamber having a liquid phase side and a gas phase side above the liquid phase side and a top wall of the condenser chamber of the gas phase side is inclined downward from the steam flow-in port.

3. A water level measuring apparatus according to claim 1, further comprising a thermometer for measuring a temperature of the gas phase portion in the condenser, a temperature controller for monitoring the temperature detected by the thermometer and outputting a temperature drop signal when the temperature of the gas phase portion drops by a predetermined amount of temperature and a heating means operating in response to the temperature drop signal to heat the condenser chamber.

4. A water level measuring apparatus according to claim 3, wherein said heating means is an electric heater disposed so as to heat the gas phase portion of the condenser chamber.

5. A water level measuring apparatus according to claim 3, wherein said heating means is an electric heater disposed so as to heat the liquid phase portion of the condenser chamber.

6. A water level measuring apparatus according to claim 1, further comprising a thermometer for measuring a temperature of the gas phase portion in the condenser, a temperature controller for monitoring the temperature detected by the thermometer and outputting a temperature drop signal when the temperature of the gas phase portion drops by a predetermined amount of temperature and a fan means operating in response to the temperature drop signal to apply air blow to the condenser chamber so as to increase a condensing ratio in the condenser and a steam flow-in efficiency therein.

7. A water level measuring apparatus according to claim 1, further comprising a thermometer for measuring a temperature of the gas phase portion in the condenser, a temperature controller for monitoring the temperature detected by the thermometer and outputting a temperature drop signal when the temperature of the gas phase portion drops by a predetermined amount of temperature, a gas discharge vessel connected to the gas phase portion of the condenser through a connection pipe, and a valve means mounted to the connection pipe operating in response to the temperature drop signal.

8. A water level measuring apparatus according to claim 1, being represented by a reactor water level measuring apparatus for measuring a water level in a reactor pressure vessel and wherein said steam phase side pressure detector is mounted on a steam phase side of the reactor pressure vessel and said liquid phase side pressure detector is mounted on a coolant side of the reactor pressure vessel.

9. A differential pressure detecting equipment for detecting a pressure difference between a high pressure side and a low pressure side of a pipe means in which a fluid containing a non-condensable gas flows through high and low pressure portions, comprising:

a high pressure side pressure detector for detecting a high pressure side pressure;

a first condenser having a steam flow-in port and an inner condenser chamber;

a first connection pipe connecting the high pressure side pressure detector and the steam flow-in port of the first condenser;

a low pressure side pressure detector for detecting a low pressure side pressure;

a second condenser having a steam flow-in port and an inner condenser chamber;

a second connection pipe connecting the high low side pressure detector and the steam flow-in port of the second condenser;

a differential pressure detector connected to the first condenser through a first pipe connected to a bottom portion of the first condenser and connected to the second condenser through a second pipe connected to a bottom portion of the second condenser, respectively, to detect a pressure difference between water head pressure of the first and second pipes, wherein said first and second connection pipes have upward inclination θ respectively from the corresponding pressure detectors to the first and second condensers so as to satisfy an equation of 0<tan θ<D/L, in which D is an inner diameter of each of the connection pipes and L is an axial length of each of the connection pipes.

10. A differential pressure detecting equipment according to claim 9, wherein each of said first and second condensers is provided with an inner condenser chamber having a liquid phase side and a gas phase side above the liquid phase side and a top wall of the condenser chamber of the gas phase side is inclined downward from the steam flow-in port side.

11. A differential pressure detecting equipment according to claim 9, further comprising first and second thermometers for measuring temperatures of the gas phase portions in the first and second condenser, first and second temperature controllers for monitoring the temperatures detected by the thermometers and outputting temperature drop signals when the temperatures of the gas phase portions drop by predetermined amount of temperatures and first and second heating means operating in response to the temperature drop signals to heat the condenser chambers.

12. A differential pressure detecting equipment according to claim 11, wherein each of said heating means is an electric heater disposed so as to heat the gas phase portion of the condenser chamber.

13. A differential pressure detecting equipment according to claim 12, wherein each of said of heating means is an electric heater disposed so as to heat the liquid phase portion of the condenser chamber.

14. A differential pressure detecting equipment according to claim 9, further comprising first and second thermometers for measuring temperatures of the gas phase portions in the first and second condensers, first and second temperature controllers for monitoring the temperatures detected by the first and second thermometers and outputting temperature drop signals when the temperatures of the gas phase portions drop by predetermined amount of temperatures and first and second fan means operating in response to the temperature drop signals to apply air blow to the first and second condenser chambers so as to increase condensing ratios in the condensers and steam flow-in efficiencies therein.

15. A differential pressure detecting equipment according to claim 9, further comprising first and second thermometers for measuring temperatures of the gas phase portions in the first and second condensers, a first and second temperature controllers for monitoring the temperatures detected by the first and second thermometer and outputting temperature drop signals when the temperatures of the gas phase portions drop by predetermined amount of temperatures, first and second gas discharge vessels connected to the gas phase portions of the condensers through connection pipes, and valves means mounted to the connection pipes operating in response to the temperature drop signals.

16. A differential pressure detecting equipment according to claim 9, wherein said pipe means is a main steam pipe extending from a steam phase side of a reactor pressure vessel as a venturi pipe having a throttled portion to which said low pressure side pressure detector is connected.

* * * * *